United States Patent [19]

Wickramasinghe et al.

[11] Patent Number: 4,947,034
[45] Date of Patent: Aug. 7, 1990

[54] APERTURELESS NEAR FIELD OPTICAL MICROSCOPE

[75] Inventors: Hemantha K. Wickramasinghe, Chappaqua; Clayton C. Williams, Peekskill, both of N.Y.

[73] Assignee: International Business Machines Corporation, Armonk, N.Y.

[21] Appl. No.: 344,621

[22] Filed: Apr. 28, 1989

[51] Int. Cl.$^5$ .............................................. H01J 3/14
[52] U.S. Cl. ..................................... 250/216; 350/507
[58] Field of Search ..................... 350/507, 502, 576; 250/216

[56] References Cited

U.S. PATENT DOCUMENTS

| | | | |
|---|---|---|---|
| 3,745,353 | 7/1973 | Jernigan et al. | 250/216 |
| 3,798,449 | 3/1974 | Reinheimer et al. | 250/201 |
| 3,914,055 | 10/1975 | Wolga et al. | 365/75 |
| 4,042,822 | 8/1977 | Brandewie et al. | 250/216 |
| 4,074,312 | 2/1978 | van Rosmalen | 358/128 |
| 4,092,070 | 5/1978 | Smithline | 356/106 S |
| 4,131,825 | 12/1978 | Mattsson | 315/39.61 |
| 4,198,571 | 4/1980 | Sheppard | 250/571 |
| 4,445,209 | 4/1984 | Mickelson et al. | 369/45 |
| 4,537,477 | 8/1985 | Takagi et al. | 350/507 |
| 4,568,152 | 2/1986 | Merstallinger et al. | 350/507 |
| 4,604,520 | 8/1986 | Pohl | 250/216 |
| 4,634,854 | 1/1987 | Wirick | 250/216 |

OTHER PUBLICATIONS

D. W. Pohl et al., "Optical Stethoscopy: Image Recording with Resolution $\gamma/20$", Appl. Phys. Lett., 44(7), Apr. 1, 1984, pp. 651-653.

A. Lewis et al., "Scanning Optical Spectral Microscopy with 500 Å Spatial Resolution", Biophys. Jrl., vol. 41, 1983, p. 405a.

Primary Examiner—Davis L. Willis
Assistant Examiner—Que Tan Le
Attorney, Agent, or Firm—Philip J. Feig

[57] ABSTRACT

A near field optical microscopy method and apparatus eliminates the necessity of an aperture for scanning a sample surface and greatly reduces the detected background signal. A small dimension tip, on the order of atomic dimension, is disposed in close proximity to the sample surface. A dither motion is applied to the tip at a first frequency in a direction substantially normal to the plane of the sample surface. Dither motion is simultaneously applied to the sample at a second frequency in a direction substantially parallel to the plane of the sample surface. The amplitude of the motions are chosen to be comparable to the desired measurement resolution. The end of the tip is illuminated by optical energy. The scattered light from the tip and surface is detected at the difference frequency for imaging the sample surface at sub-wavelength resolution without the use of an aperture. Alternatively, the tip is maintained stationary and the sample undergoes motion in the two directions.

25 Claims, 3 Drawing Sheets

APERTURELESS NEAR FIELD OPTICAL MICROSCOPE

BACKGROUND OF THE INVENTION

This invention relates to near field optical microscopy, and more particularly to a method and apparatus which eliminates the requirement for and hence the optical limitations of an aperture in near field optical microscopy. As a result, resolution of 1 nm or smaller using visible light wavelengths is obtainable.

Efforts to date in the art of near field optical microscopy have centered upon the generation of ultrasmall apertures on transparent tips or flat surfaces. Such work is described in the article entitled "Optical Stethoscopy: Image Recording With Resolution g/20" by D. W. Pohl et al, Appl. Phys. Lett. Vol. 44, No. 7, Apr. 1984, pp. 651 to 653 and in "Scanning Optical Spectral Microscopy with 500Å Spatial Resolution" by A. Lewis et al, Biophys. Journal, Vol. 41, 1983, p. 405a.

The ultrasmall apertures generate a sub wavelength source of optical power which can be used to image surfaces with sub wavelength resolution when the aperture is scanned in close proximity to the aligned surface. There are two inherent limitations to the use of such apertures. First, the structures must be physically built onto a small tip (sub micrometer) when non-flat surfaces are to be imaged. Constructing such structures have proven to be technologically challenging. Second, there is a theoretical limit. In order to achieve the highest resolution, the aperture size should be reduced toward atomic (on the order of 1 nm) dimensions. However, the improvement in resolution does not steadily improve as the aperture size decreases. This effect is due to the aperture material having a finite absorption length, typically greater than 100 angstroms. The ultrasmall apertures, therefore, are not useful when the dimension sought to be resolved approaches the absorption length.

The present invention obviates the requirement of an aperture in near field optical microscopy by using a metallic or dielectric tip having very small dimensions, on the order of atomic dimension. Such a tip is found, for instance, in a scanning thermal profiler, scanning tunneling microscope, atomic force microscope or the like. A light beam illuminates the tip and a portion of the light striking the tip scatters and forms local evanescent fields from the very end region of the tip to the sample surface which is in proximity to the tip. The evanescent fields very close to the tip will interact with the surface atoms of the sample. By applying a first dither motion at a first frequency to the tip in a direction normal to the plane of the sample surface and applying a second dither motion at a second frequency to the sample in a direction parallel to plane of the sample surface, a detector is able to receive surface image signals at a difference frequency of the two dither frequencies having a high resolution without the background signal overwhelming the desired image signal. In an alternative embodiment, the tip is held stationary and the sample is made to undergo motion in both of the above mentioned directions each at a different frequency. The essence of the present invention is the obviating of the requirement of an aperture in a near field optical microscope and processing of the surface image signals to remove the adverse affects of the background signal.

SUMMARY OF THE INVENTION

A principal object of the present invention is therefore, the provision in near field optical microscopy of generating a sub wavelength light source which is capable of being scanned in close proximity to an object surface without the use of an aperture.

Another object of the present invention is the provision of a simple metallic or dielectric tip having very small dimensions to replace the heretofore used apertures in near field optical microscopy.

A further object of the invention is the provision of dither motion applied simultaneously to a tip and to the sample for improving image resolution by elimination of background scattered light.

A still further object of the invention is the provision of dither motion applied simultaneously to a sample in two orthogonal directions while maintaining the tip stationary for improving image resolution by elimination of background scattered light.

Further and still other objects of the invention will become more clearly apparent when the following description is read in conjunction with the accompanying drawings.

DETAILED DESCRIPTION

Figure 1:
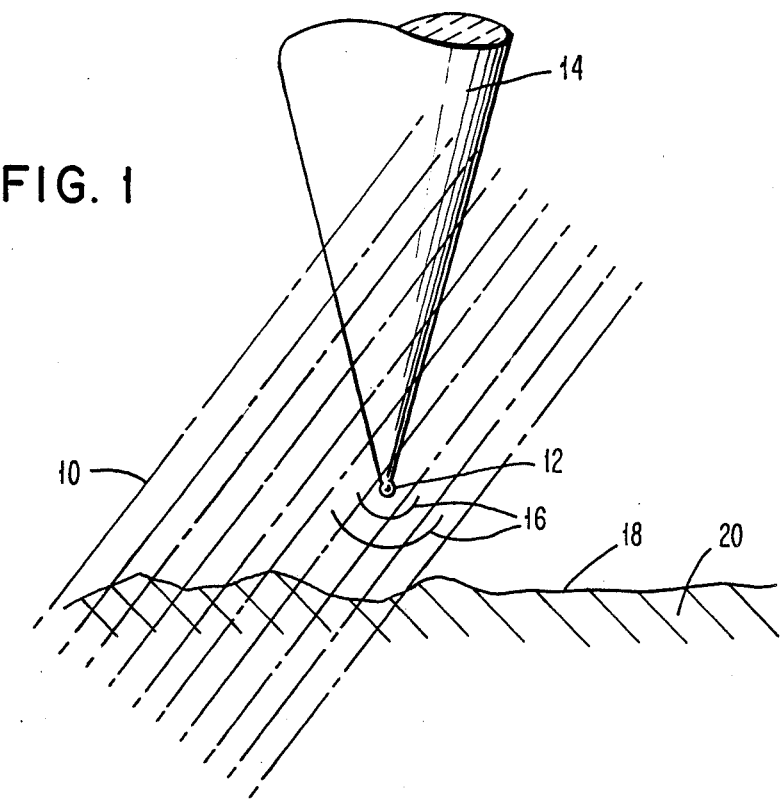
FIG. 1 is a schematic representation of the interaction between a tip and a sample surface.

A basic limitation in near field optical microscopy is the generation of a sub wavelength light source which is capable of being scanned in close proximity to a sample surface. As an alternative to the use of an aperture, a simple metallic or dielectric tip having very small dimensions, on the order of atomic dimension, can be used. The construction and dimensioning of such a tip is well known in art and is used in devices such as scanning tunneling microscopes. As shown in FIG. 1, incident light indicated by parallel light beams 10 scatter at the end 12 of tip 14 thereby generating local evanescent fields (shown at 16) which are capable of interacting with the surface 18 of a sample 20 with high spatial resolution. For example, an ideal conical tip having a single atom or group of atoms at the very end which is illuminated by a focused light source, will result in optical evanescent fields diverging from the tip. The divergent fields will interact with the sample surface on a local scale. These fields will be scattered by the surface and a portion will propogate into the far field, where the fields may be detected, providing a useful signal for measuring the local optical and topographical properties of the surface with high resolution. Optical properties of the sample surface capable of being measured include the complex index of refraction on a localized basis, i.e. the real and imaginary parts of the dielectric constant. The complex index of refraction determines local surface reflectivity, local surface transmissivity, and local surface absorption.

The light source may be a fixed or tunable frequency laser, a CW or pulsed laser operating in the x-ray, UV, visible, IR or microwave part of the spectrum, or the like.

A problem with the arrangement above is the fact that the scattering efficiency of the tip is very small. The light scattered from the surface and in a non-ideal situation from regions of the tip other than the very end (background region) would, in general, greatly exceed the light power reflected from the very end of the tip. The result is that obtaining useful or desired information in the manner described in conjunction with FIG. 1 is virtually impossible.

Figure 2:
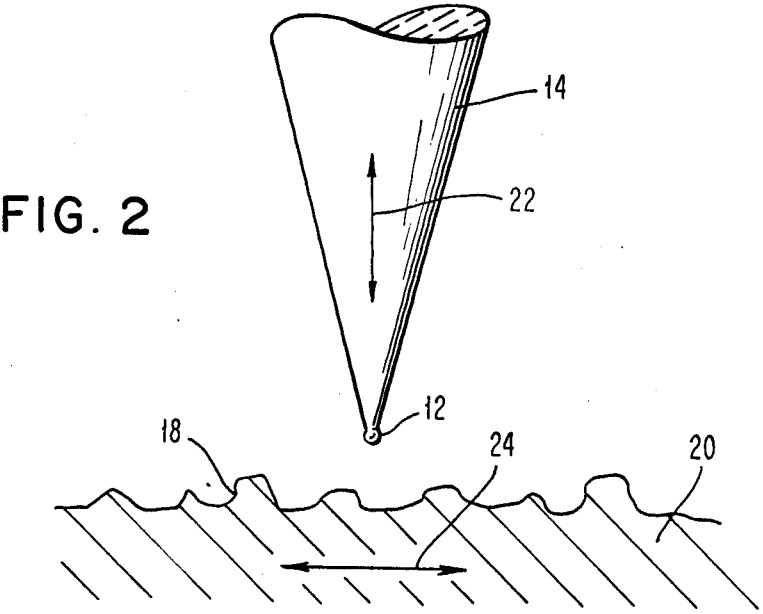
FIG. 2 is a schematic representation of the tip and the sample surface with dither motion indicated.

The invention, as shown schematically in FIG. 2, concerns the simultaneous application of a vibratary or dither motion at a first frequency to the tip 14 in the direction of double headed arrow 22 along the longitudinal axis of the tip, in a direction substantially normal to the plane of the sample surface and dither motion at a second frequency to the sample in the direction of double headed arrow 24 in a direction substantially parallel to the plane of the sample surface. As a result, the scattered light reflected from the tip and the sample surface can be measured at the difference frequency, i.e. at a frequency equal to the difference of the first frequency and the second frequency. In a preferred case, the vibrational amplitudes of both dither motions are chosen to be comparable to the desired measurement resolution, in the range of approximately 0.1 to 1000 Angstrom, and the tip is disposed in close proximity to the sample surface. While the amplitudes of both dither motions need not be equal, both amplitudes should be of the same order of magnitude. In such an arrangement, the background scattering can be eliminated from the signal at the difference frequency ($f_1-f_2$), thus rendering the desired reflected light signal easier to detect and measure. The first and second frequencies are in the range between 100 Hz and 1 MHz. The described arrangement also obviates the requirement of an aperture for focussing and detecting light beams.

Methods and apparatus for applying dither motion to the tip at a first frequency $f_1$, for instance, by piezoelectric means and by applying dither motion to a sample at a second frequency to be imaged by piezoelectric means are well known in the art.

Figure 3:
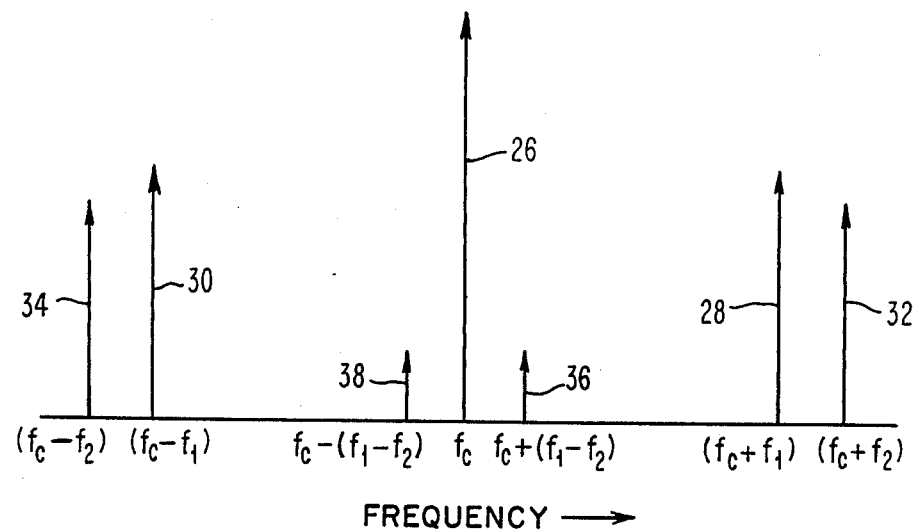
FIG. 3 is a graphical representation of an optical heterodyne signal.

The manner of reducing background signals is illustrated graphically in FIG. 3 which shows the results of optically mixing the received scattered field responsive signal in a heterodyne arrangement. Heterodyne arrangements are known in the art. The simultaneous dither motions of the tip and the sample produce amplitude and phase modulation of the scattered light and produce sidebands of the heterodyne carrier.

The carrier signal at frequency $f_c$ is shown as line 26. The frequency $f_c$ is typically 80 MHz. The sideband signals arising solely from the tip motion occur at the frequencies $f_c+f_1$ and $f_c-f_1$ are shown as lines 28 and 30. The sideband signals arising solely from the sample motion occur at frequencies $f_c+f_2$ and $f_c-f_2$, shown as lines 32 and 34. The desired signals resulting from the combined motion of the tip and the sample occur at frequencies $f_c+(f_1-f_2)$ and $f_c-(f_1-f_2)$, shown as lines 36 and 38 respectively. It will be obvious to one skilled in the art that additional signals occur at the frequencies $f_c+(f_1+f_2)$ and $f_c-(f_1+f_2)$ which are not shown. These sum signals are also useable for measuring optical properties of the sample surface. The carrier and unwanted sidebands are filtered out using conventional methods and, in the preferred embodiment, only the difference frequency signals resulting from the two dither motions is detected.

The resultant detected signal at the difference frequency ($f_1-f_2$) (or alternating the sum frequency ($f_1+f_2$)) is very localized at the end of the tip since it is only at that location where the light will be phase and/or amplitude modulated by both dither motions. The two dither motions provide a background isolation such that effects of unwanted scatters decrease as the sixth power of the distance between the unwanted scatterer and the tip end.

The heterodyne detection of the scattered light beam will provide the means for shot noise limited detection. In principle, a homodyne system could also be used if the scattered light from the upper portion of the tip (away from the end) were combined with the scattered light from the end of the tip, thereby producing shot noise limited detection.

Figure 4:
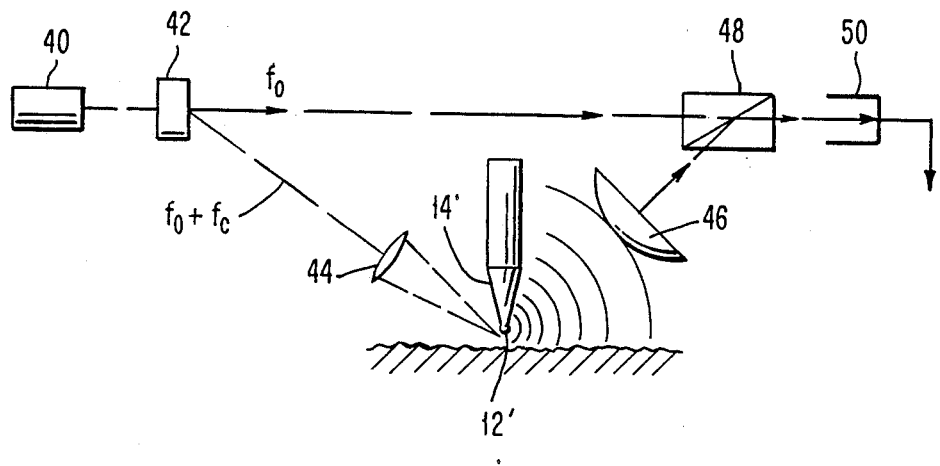
FIG. 4 is a schematic representation of a heterodyne detection system.

Referring to FIG. 4, an optical source 40 such as a laser, transmits a beam of light at a frequency $f_o$ to an acousto-optic modulator 42. A first portion of the beam entering the acousto-optic modulator 42 is transmitted through a lens 44 and is focussed on the end 12' of tip 14'. The incident beam is of a frequency $f_o+f_c$ where $f_c$ is the carrier frequency. The light beam is forward scattered by the tip and is colimated by lens 46 and focussed at beam splitter 48. A second portion of the light beam entering the acousto-optic modulator 42 is transmitted directly to the beam splitter 48. The two signals are combined at the beam splitter 48 to yield a light beam at the carrier frequency $f_c$ which beam is detected at a pin photodiode 50 from which an RF carrier signal at frequency $f_c$ with sidebands is provided for further known signal processing.

Figure 5:
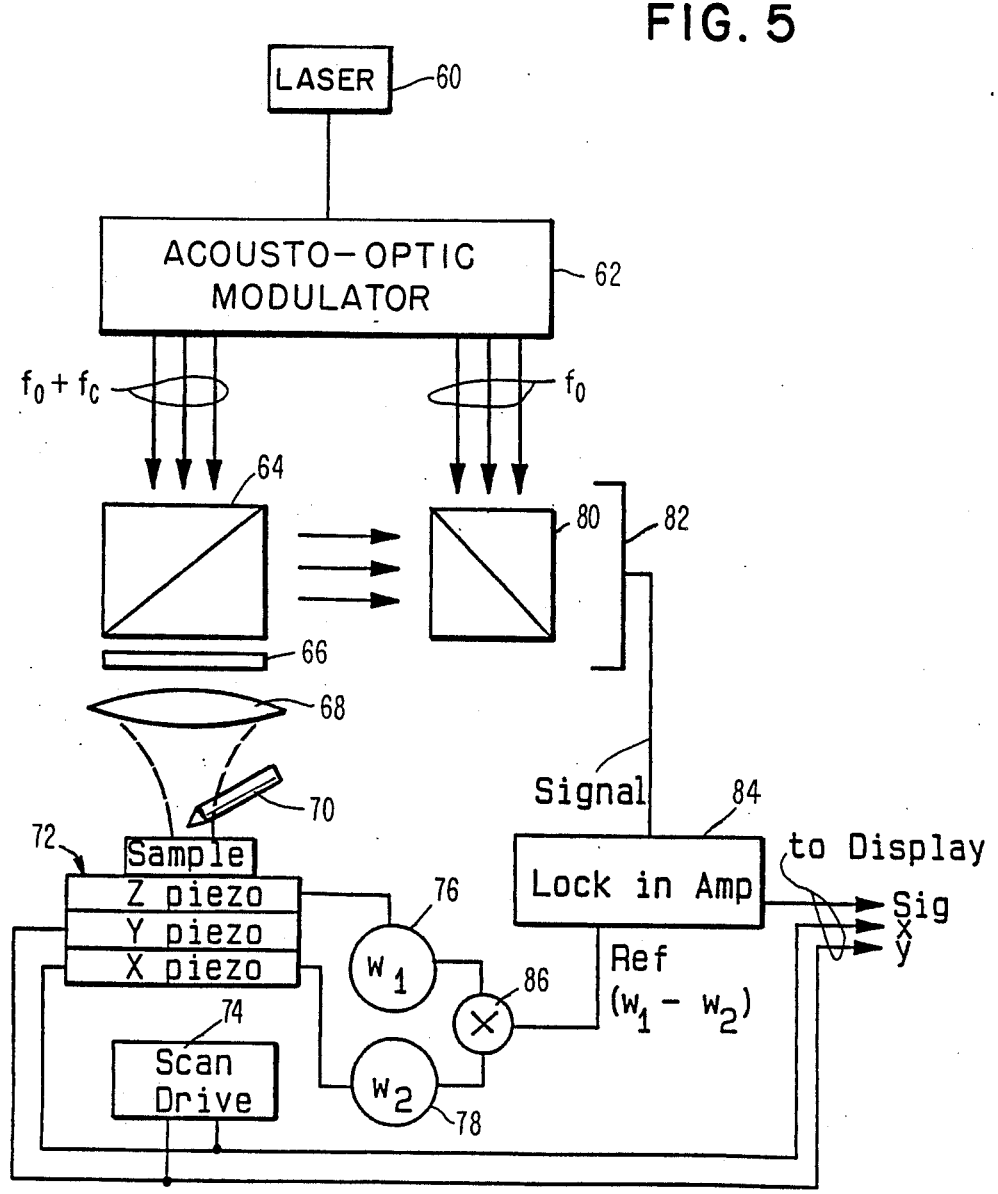
FIG. 5 is a schematic block diagram of a preferred embodiment of the present invention.

FIG. 5 is a block diagram of a preferred embodiment for an apertureless near field optical microscope. A laser 60 transmits an optical energy beam to an acousto-optic modulator 62. The acousto-optic modulator provides two output optical beams. The first beam is at a frequency $f_o+f_c$ and is serially transmitted through a polarizing beam splitter 64, a quarter wave plate 66 and a colimatting lens 68 to the end of stationary tip 70 and the sample surface.

The sample is located on a platform (not shown) coupled for movement in three orthogonal directions by means of an x-piezoelectric drive, y-piezoelectric drive and z-piezoelectric drive, all shown as reference numeral 72. The x and y axes are parallel to the surface of the sample and the z axis is in a direction normal to the sample surface.

In order to measure the entire surface, the sample is made to move in the x and y axes directions, beneath the stationary tip 70, by means of a scan drive 74 controlling the x-piezoelectric drive and y-piezoelectric drive.

Oscillator 76 provides a signal to the z-piezoelectric drive at a frequency $w_1$ for causing the sample to undergo oscillatory motion in the z-axis direction at a frequency $w_1$, toward and away from stationary tip 70 along an axis normal to the sample surface.

Oscillator 78 likewise provides a signal to the x piezoelectric drive at a frequency $w_2$ for causing the sample to undergo oscillatory motion at a frequency $w_2$ in the x-axis direction, normal to the z-axis motion. Of course, the signal from oscillator 78 can equally as well be connected to the y-pizoelectric drive in order to achieve the same results.

The frequencies, $w_1$ and $w_2$, of the signals from oscillators 76 and 78 are in the range from approximately 100 Hz to 1 MHz. The signals are of such amplitude for causing the respective pizoelectric drive to cause the sample to undergo motion at an amplitude of approximately 0.1 to 1000 Angstroms in both directions.

The light beam reflection from the tip and sample in a manner as generally described above in conjunction with FIGS. 2 and 4, is back scattered through the lens 68, quarter wave plate 66 and polarizing beam splitter 64. The back scattered light signal by virtue of passing through the described optical system is separated from the light signal from acousto-optic modulator 62 and is reflected to beam combiner 80. Beam combiner 80 combines the back scattered light beam from polarizing beam splitter 64 with the second light beam from acousto-optic modulator 62. The second light beam from the acousto-optic modulator is at a frequency $f_o$. The combined optical signal from beam combiner 80 is detected by a detector 82 and converted to an electric signal. The output of detector 82 is provided as one input to a lock-in-amplifier 84. The other input to lock-in aplifier 84 is a reference signal from mixer 86. The reference signal is preferably at the difference frequency of the two dither motions, i.e. a frequency equal to $w_1-w_2$. Alternatively, the sum frequency, $w_1+w_2$, could also be used.

The lock-in-amplifier 84 provides an output signal indicative of the sample surface optical properties. The output signal, along with the x-axis and y-axis position information from scan drive 74 are connected to a display (not shown) for providing an image or other suitable output of the sample surface optical properties with atomic or sub-nanometer resolution.

In the event the background signal is not completely eliminated, the low spatial frequency content of the background signal as the tip scans the sample can be reduced by analog or digital filtering. The remaining measured signal variations which have high spatial frequency content still provide useful information on a very small scale.

Even when the background problem is eliminated by the arrangement described above, the sensitivity of the measurement remains. Calculation of the scattering cross section of a single free electron under Thomson scattering conditions, yields the result that with 10 milliwatts of optical power focused to a spot of 0.5 micrometers, detection of a single free electron with a signal-to-noise ratio of 6 can be detected in a 1 Hz bandwidth. The calculation shows that single atom detection is possible using the described techniques. Images similar to those of a scanning tunneling microscope may be possible, except that the optical properties generate the contrast rather than the electrically accessible electron states. Using the described technique, optical spectroscopy of sample surfaces can identify atomic species on an atomic scale at sub-wavelength resolution.

While there has been described and illustrated a near field optical microscopy method and apparatus, it will be apparent to those skilled in the art that modifications and variations are possible without deviating from the broad principle of the present invention which shall be limited solely by the scope of the appended claims.

What is claimed is:

1. An apertureless near field optical microscopy method of measuring the optical properties of a surface of a sample comprising the steps of:
    disposing a tip having an end in proximity to the sample surface;
    applying a first dither motion at a first frequency for causing the tip and sample surface to undergo relative motion toward and away from each other in a direction substantially normal to the plane of the sample surface;
    applying simultaneously a second dither motion at a second frequency for causing the tip and sample surface to undergo relative motion in a direction substantially parallel to the plane of the sample surface;
    illuminating the end of the tip with optical energy; and
    detecting the light scattered from the end of the tip and the sample surface at a frequency related to said first frequency and said second frequency for measuring optical properties of the sample surface.

2. An apertureless near field optical microscopy method of measuring optical properties of a surface of a sample as set forth in claim 1, wherein the amplitude of said first and said second dither motions are comparable to the measuring resolution.

3. An apertureless near field optical microscopy method of measuring optical properties of a surface of a sample as set forth in claim 2, wherein the amplitudes of said first and said second dither motions are both in the range between approximately 0.1 to 1000 Angstroms.

4. An apertureless near field optical microscopy method of measuring optical properties of a surface of a sample as set forth in claim 2, wherein said first and second frequencies are in the range between approximately 100 Hz and 1 MHz.

5. An apertureless near field optical microscopy method of measuring optical properties of a surface of a sample as set forth in claim 3, wherein said first and second frequencies are in the range between approximately 100 Hz and 1 MHz.

6. An apertureless near field optical microscopy method of measuring optical properties of a surface of a sample as set forth in claim 1, wherein said frequency related to said first and said second frequency is the difference between said first and said second frequencies.

7. An apertureless near field optical microscopy method of measuring optical properties of a surface of a sample as set forth in claim 1, wherein said frequency related to said first and said second frequency is the sum of said first and said second frequencies.

8. An apertureless near field optical microscopy method of measuring optical properties of a surface of a sample as set forth in claim 1, further comprising the step of providing a signal responsive to said detected scattered light for displaying optical properties of the surface of the sample.

9. An apertureless near field optical microscopy method of measuring optical properties of a surface of a sample as set forth in claim 8, further comprising the step of scanning the sample relative to the tip.

10. An apertureless near field optical microscopy method of measuring optical properties of a surface of a sample as set forth in claim 1, wherein the tip is maintained stationary and the sample undergoes both said dither motions.

11. An apertureless near field optical microscopy method of measuring optical properties of a surface of a sample as set forth in claim 1, wherein the tip undergoes said first dither motion and the sample undergoes said second dither motion.

12. An apertureless near field optical microscopy method of measuring optical properties of a surface of a sample as set forth in claim 1, wherein said illuminating with optical energy is illuminating by laser means.

13. An apertureless near field microscope for measuring optical properties of a surface of a sample comprising:
   a tip having an end disposed in proximity to the sample surface;
   means for applying a first dither motion at a first frequency for causing the tip and sample surface to undergo relative motion toward and away from each other in a direction substantially normal to the plane of the sample surface;
   means for applying a second dither motion at a second frequency for causing the tip and sample surface to undergo relative motion in a direction substantially parallel to the plane of the sample surface;
   means for illuminating the end of said tip with optical energy, and
   detection means for detecting the light scattered from the end of said tip and the sample surface at a frequency related to said first frequency and said second frequency for measuring optical properties of the sample surface.

14. An apertureless near field microscope for measuring optical properties of a surface of a sample as set forth in claim 13, wherein the amplitude of said first and said second dither motions are comparable to the measuring resolution.

15. An apertureless near field microscope for measuring optical properties of a surface of a sample as set forth in claim 14, where the amplitudes of said first and said second dither motions are both in the range between approximately 0.1 to 1000 Angstroms.

16. An apertureless near field microscope for measuring optical properties of a surface of a sample as set forth in claim 14, wherein said first and said second frequencies are in the range between approximately 100 Hz and 1 MHz.

17. An apertureless near field microscope for measuring optical properties of a surface of a sample as set forth in claim 15, wherein said first and said second frequencies are in the range between approximately 100 Hz and 1 MHz.

18. An apertureless near field microscope for measuring optical properties of a surface of a sample as set forth in claim 13, wherein said detection means detects the light scattered at a frequency related to the difference between said first and second frequencies.

19. An apertureless near field microscope for measuring optical properties of a surface of a sample as set forth in claim 13, wherein said detection means detects the light scattered a frequency related to the sum of said first and second frequencies.

20. An apertureless near field microscope for measuring optical properties of a surface of a sample as set forth in claim 13, further comprising imaging means coupled to said detection means for displaying optical properties of the surface of the sample.

21. An apertureless near field microscope for measuring optical properties of a surface of a sample as set forth in claim 13, wherein said means for applying a first dither motion moves said tip and said means for applying a second dither motion moves the sample surface.

22. An apertureless near field microscope for measuring optical properties of a surface of a sample as set forth in claim 13, wherein said means for applying a first dither motion moves the sample surface and means for applying to second dither motion moves the sample surface while said tip remains stationary.

23. An apertureless near field microscope for measuring optical properties of a surface of a sample as set forth in claim 13, wherein said means for illuminating is a laser.

24. An apertureless near field microscope for measuring optical properties of a surface of a sample as set forth in claim 13, further comprising means for scanning the sample surface relative to said tip.

25. An apertureless near field optical microscope for measuring optical properties of a surface of a sample comprising:
   a tip having an end disposed in proximity to the sample surface;
   illumination means for providing a beam of optical energy;
   acousto-optic modulation means for receiving said beam of optical energy and providing a first optical beam and a second optical beam;
   beam splitter means for receiving said first beam and splitting a portion thereof and for receiving and splitting a portion of a backscattered signal;
   quarter wave plate for passing therethrough the split portion of said first beam and the back scattered signal;
   lens means for focussing the beam from said quarter wave plate onto the end of said tip and for focussing the back scattered signal onto said quarter wave plate;
   beam combiner means for combining the split portion of the back scattered signal from said beam splitter means and said second optical beam;
   detection means for detecting the output of said beam combiner means and providing an electrical signal responsive thereto;
   means for causing a first dither motion at a first frequency for causing the tip and sample surface to undergo relative motion toward and away from each other in a direction substantially normal to the plane of sample surface;
   means for causing a second dither motion at a second frequency for causing the tip and sample surface to undergo relative motion in a direction substantially parallel to the plane of the sample surface;
   means for providing a reference signal at a frequency substantially equal to the difference between said first and said second frequencies;
   amplifier means coupled to receive said reference signal and said electrical signal for providing an output signal indicative of the optical properties of the sample surface;
   scanning means for causing said sample surface to undergo motion relative to said tip in a plane substantially parallel to the sample surface, and
   display means for imaging optical properties of the sample surface.

* * * * *